United States Patent
Schreiber et al.

(10) Patent No.: US 10,635,074 B2
(45) Date of Patent: Apr. 28, 2020

(54) ROBUST INTUITIVE OPERATING METHOD BY TOUCHING A MANIPULATOR

(71) Applicant: KUKA Deutschland GmbH, Augsburg (DE)

(72) Inventors: Günter Schreiber, Friedberg (DE); Bettina Pfaff, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 90 days.

(21) Appl. No.: 15/559,926

(22) PCT Filed: Mar. 21, 2016

(86) PCT No.: PCT/EP2016/056132
§ 371 (c)(1),
(2) Date: Sep. 20, 2017

(87) PCT Pub. No.: WO2016/150907
PCT Pub. Date: Sep. 29, 2016

(65) Prior Publication Data
US 2018/0074475 A1    Mar. 15, 2018

(30) Foreign Application Priority Data

Mar. 23, 2015    (DE) .................. 10 2015 205 176

(51) Int. Cl.
*G05B 19/19*    (2006.01)
*G05B 19/423*    (2006.01)
(Continued)

(52) U.S. Cl.
CPC ............ *G05B 19/19* (2013.01); *B25J 9/1633* (2013.01); *G05B 11/01* (2013.01); *G05B 19/423* (2013.01);
(Continued)

(58) Field of Classification Search
CPC ........ G05B 19/19; G05B 11/01; G05B 23/02; G05B 19/423; G05B 2219/39001;
(Continued)

(56) References Cited

U.S. PATENT DOCUMENTS 6,212,443 B1 *    4/2001    Nagata ................. G05B 19/423
                                                                    700/245
8,855,815 B2 *    10/2014    Mizutani .............. G05B 19/423
                                                                    318/560
(Continued)

FOREIGN PATENT DOCUMENTS

CN            102039596 A    5/2011
CN            102056715 A    5/2011
(Continued)

OTHER PUBLICATIONS

European Patent Office; Search Report in International Patent Application No. PCT/EP2016/056132 dated Jun. 20, 2016; 4 pages.
(Continued)

*Primary Examiner* — Jaime Figueroa
(74) *Attorney, Agent, or Firm* — Dorton & Willis, LLP

(57) ABSTRACT

A method for controlling a manipulator includes releasing the manipulator in reaction to a release request by an operator, wherein the recognition of the release request involves monitoring the variation over time of a measured value that is characteristic of a state of the manipulator. Increased robustness of the recognition of the release request results.

15 Claims, 2 Drawing Sheets

(51) Int. Cl.
*B25J 9/16* (2006.01)
*G05B 11/01* (2006.01)
*G05B 23/02* (2006.01)

(52) U.S. Cl.
CPC .... *G05B 23/02* (2013.01); *G05B 2219/36418* (2013.01); *G05B 2219/36483* (2013.01); *G05B 2219/39001* (2013.01)

(58) Field of Classification Search
CPC . G05B 2219/36483; G05B 2219/36418; B25J 9/1633
USPC .................................................. 700/245, 263
See application file for complete search history.

(56) References Cited

U.S. PATENT DOCUMENTS

| | | | | |
|---|---|---|---|---|
| 9,227,321 B2* | 1/2016 | Klumpp | ................ | B25J 9/1648 |
| 9,345,544 B2* | 5/2016 | Hourtash | ............... | B25J 9/1607 |
| 9,533,416 B2* | 1/2017 | Garde | .................... | B25J 9/1651 |
| 10,188,471 B2* | 1/2019 | Brisson | .................. | A61B 34/35 |
| 2005/0222587 A1* | 10/2005 | Jinno | ..................... | A61B 34/70 |
| | | | | 606/130 |
| 2008/0188985 A1* | 8/2008 | Sakano | ................. | B25J 9/1648 |
| | | | | 700/260 |
| 2008/0245175 A1 | 10/2008 | Jinno et al. | | |
| 2011/0015785 A1 | 1/2011 | Tsusaka et al. | | |
| 2011/0087375 A1 | 4/2011 | Aurnhammer et al. | | |
| 2011/0190932 A1* | 8/2011 | Tsusaka | .................. | B25J 13/08 |
| | | | | 700/254 |
| 2011/0208355 A1* | 8/2011 | Tsusaka | ................. | B25J 9/1664 |
| | | | | 700/246 |
| 2012/0283875 A1* | 11/2012 | Klumpp | ................ | B25J 9/1648 |
| | | | | 700/258 |
| 2014/0222207 A1* | 8/2014 | Bowling | ................ | A61B 34/32 |
| | | | | 700/261 |
| 2014/0379126 A1* | 12/2014 | Ueberle | ................. | B25J 9/1674 |
| | | | | 700/245 |
| 2016/0089212 A1* | 3/2016 | Balicki | .................... | B25J 13/02 |
| | | | | 606/130 |
| 2016/0107315 A1* | 4/2016 | Klumpp | ................. | B25J 9/1648 |
| | | | | 29/407.08 |
| 2017/0057095 A1* | 3/2017 | Oestergaard | ........... | B25J 9/1674 |

FOREIGN PATENT DOCUMENTS

| | | |
|---|---|---|
| DE | 102008027008 A1 | 12/2009 |
| DE | 102008062622 A1 | 6/2010 |
| DE | 102010029745 A1 | 12/2011 |
| DE | 102011079117 A1 | 1/2013 |
| EP | 1754448 A1 | 2/2007 |
| EP | 2299344 A2 | 3/2011 |
| EP | 2392435 A2 | 12/2011 |
| EP | 2392435 A3 | 5/2013 |
| WO | 2011082755 A1 | 7/2011 |
| WO | 2014022786 A2 | 2/2014 |

OTHER PUBLICATIONS

German Patent Office; Issued Patent No. DE 10 2015 205 176 dated May 12, 2016 in related German Patent Application No. 10 2015 205 176.5; 10 pages.

Chinese Patent Office; Office Action in related Chinese Patent Application No. 201680017955.5 dated Oct. 8, 2019; 5 pages.

Chinese Patent Office; Search Report in related Chinese Patent Application No. 201680017955.5 dated Sep. 24, 2019; 2 pages.

* cited by examiner

ROBUST INTUITIVE OPERATING METHOD BY TOUCHING A MANIPULATOR

CROSS-REFERENCE

This application is a national phase application under 35 U.S.C. § 371 of International Patent Application No. PCT/EP2016/056132, filed Mar. 21, 2016 (pending), which claims the benefit of German Patent Application No. DE 10 2015 205 176.5 filed Mar. 23, 2015, the disclosures of which are incorporated by reference herein in their entirety.

TECHNICAL FIELD

The present invention relates to a method for controlling a manipulator, in particular an articulated arm robot to provide a robust and intuitive operating method for the manipulator.

BACKGROUND

Manipulators and in particular articulated arm robots are user-programmable, software-controlled handling devices. The manipulator can consist of a certain number of movable, sequentially linked members or axes that define the kinematic chain of the manipulator. The kinematic chain typically extends from the manipulator base to the flange of the manipulator, or, if present, to a tool connected with the flange.

The individual axes of the manipulator are moved in this case by deliberately controlling drives that are connected with the individual components of the manipulator. While programming the manipulator software, certain parameters, such as velocity, can be specified for a motion between individual points.

A known manipulator and an associated control method have been disclosed in the U.S. disclosure filing 2008/0245175 A1.

An internal company method is known wherein a manipulator is guided by hand; an operator in this case actuates a release switch and then grabs the manipulator at one of its members or on the flange and/or the tool connected with the flange (end effector) and guides the manipulator to its desired position. This involves using a so-called gravitational compensation to intuitively guide the manipulator by touch into the desired position, wherein the internal torque sensors of the manipulators are used.

For instance, the torque sensors detect when an external force acts on the manipulator. Based on the (dynamic) model that describes the configuration and the function of the manipulator, the controller of the manipulator can determine whether this acting force is e.g. based on that gravity that acts on the members of the manipulator, or whether the acting force is an additional, external force. Once the controller detects this, it releases the manipulator and the operator can very easily move the manipulator by touch. Stated more accurately, the manipulator's controller relies on the detected forces to determine the direction into which the manipulator is to be moved and sends appropriate control signals to the actuators for the relevant axes of the manipulator. Since the manipulator is typically released fully, a series of measures are required to prevent the manipulator from becoming "uncontrollable". The known measures are primarily limited to validating the dynamic model (e.g. by means of load measurements on the flange and gravitational direction). In this case, the drive torque must match the modelled torques down to a comparatively small error, as is discussed in detail below.

The known methods are accompanied by certain disadvantages. On the one hand, it is easily possible that the manipulator "drifts". This drift is particularly disadvantageous in the initially described method since the manipulator is released immediately as soon as an acknowledgement key—or the like—is pressed. Moreover, the known methods cannot differentiate between jam situations (e.g. following a crash) and model errors. The manipulator would accelerate very quickly if the manipulator were to be released with a model error as large as those typical for a jam, which can have negative or even catastrophic consequences for the completed operation and also for the operator located in the immediate vicinity.

The object of the present invention is then to provide a method that supports a particularly robust control of a manipulator, in particular an articulated arm robot. Yet another object of the present invention is to provide a particularly intuitive method for controlling a manipulator.

This and other objects, which are highlighted in the following detailed description, are solved by the scope of the independent claims.

SUMMARY

The invention comprises a method for controlling a manipulator, and in particular for controlling an articulated arm robot. The inventive method comprises detecting a release request based on an operator exerting a force on the manipulator. The method allows an operator to manually move the manipulator in the desired direction and/or position by touching and guiding. The resulting force acting on the manipulator is used to determine that the operator intends to release and/or move the manipulator, whereupon the manipulator is inventively released. The manipulator is therefore only released based on an operator request and is otherwise locked in position and/or "frozen" in the present position in a controlled manner, e.g. the manipulator disengages its brakes and attempts to hold its pose and/or position with active motors in spite of the gravity. As a general preference, the manipulator is equipped with appropriate sensors that can be used to detect the torques acting on the axes. Torque sensors based on strain gauges have shown to be particularly advantageous in this case. These are for instance arranged on the axes of the manipulator, such as the drive shafts of the actuators for the various axes. Strain gauges can be used to detect torques very accurately, thus allowing the manipulator to respond to even minimal forces.

According to the invention, detecting the release request comprises tracking a measurement value that characterizes a state of the manipulator. In contrast to known methods, which merely take into account the model errors (e.g. the difference between the modeled and measured torque, or also the difference between the commanded target position and the measured actual position), the invention relies on the knowledge that the ruggedness of detecting the operator request is significantly increased by taking into account the measurement value time series (e.g. a time-series of several measurement values).

The inventive method hereby supports several other technical advantages: on the one hand, the manipulator can also be released in borderline cases (e.g. for purposes of crash recovery), which is not possible or only with difficulty in conventional methods. Moreover, the inventive method also offers a greatly increased tolerance and/or ruggedness for model deviations, which typically occur in practice. Intuitive programming based on touch-controls (also called teaching) is also supported, along with improved drift suppression, which in turn results in increased error tolerance.

Preferably, the measurement value that characterizes a state of the manipulator consists of a torque or a position of the manipulator. Detecting the release request by tracking the torque preferably comprises detecting that a difference between a measured torque and a reference torque exceeds the magnitude of a specified error limit, wherein the reference torque is determined as an average of previously measured torques or by a snapshot measurement. A snapshot measurement essentially corresponds to determining an average with exactly one measurement; it therefore represents a special case of determining the average with exactly one measurement. However, determining a "real" average based on several values is preferred since this generates more accurate results.

Detection based on positions of the manipulator preferably comprises that a difference between a measured position and a reference position exceeds the magnitude of a specified error limit, wherein the reference value is calculated as an average of previously measured positions, or wherein the reference position is determined by a snapshot.

Releasing the manipulator also preferably comprises releasing with greater rigidity when the model is invalid, e.g. the manipulator is released "rigidly", that is to say greatly inhibited in its movement, which is particularly advantageous for crash recovery, for instance when the manipulator has been brought into a jammed state. The manipulator is otherwise preferable released fully if the model is valid.

The inventive method further preferably comprises detecting a lockout request when the operator holds the manipulator in a position for a specified timespan, and a lockout of the manipulator in response to detecting the lockout request.

The present invention further relates to a method for controlling a manipulator, in particular an articulated arm robot, that comprises detecting a release request based on the operator exerting a force on the manipulator, and—as a response to detecting the release request—a movement of the manipulator by a specified position and subsequently, preferably immediate lockout of the manipulator. For instance, the operator can merely jog the manipulator, causing the robot to then perform a movement of specified extent in the desired direction (also called jog mode). This method can for instance advantageously be used to command small motions in a specifically controlled manner, thus permitting the manipulator to be controlled in a highly accurate manner and a desired position to be incrementally approached in a highly precise manner. A person trained in the art will recognize that this method can be implemented independently of, or in combination with the initially described method.

Moving the manipulator can comprise a joint-specific or cartesian adjustment of the target position of the manipulator. A movement preferably comprises an automatic selection of the cartesian adjustment of the target position of the manipulator in response to detecting that the operator touched ("jogged") the manipulator at an end effector. This detecting can comprise evaluating a Jacobi matrix, in particular a defining a null-space.

The motion intensity, e.g. the extent of the motion, of the manipulator can be adjustable by an amplification parameter.

The inventive robot system comprises a manipulator and in particular an articulated arm robot, as well as a control device. The latter is arranged to execute at least one of the inventive methods for controlling a manipulator.

BRIEF DESCRIPTION OF THE DRAWINGS

The following is a detailed description of the present invention based on the enclosed figures.

DETAILED DESCRIPTION

Inventively, the above method detects the user request in a particularly robust manner by relying on the measurement value time series in place of the model error (difference between a modeled torque and a measured torque).

User Request Detection

A straight-forward implementation for detecting the user "release" request is based on comparing a measured torque with a modeled torque for an internal dynamic model of the manipulator. Such a dynamic model is typically defined by determining the dynamic equations of the manipulator based on the weight and geometric dimensions of the manipulator's components, for instance using the Lagrange formalism or the Newton-Fuller algorithm. The dynamic model can be used to model what torque would be required to suitably move the manipulator or what torque would for instance be required to hold a manipulator in a specified pose against the effects of gravity.

Pursuant to the above straight-forward implementation, the user "release" request is detected when the magnitude of the difference ("external torque" $T_{ext}$) from a modeled torque $T_{mdl}$ and a measured torque $T_{msr}$ $$T_{ext} = T_{msr} - T_{mdl}$$

exceeds an error limit:

$$|T_{ext}| > \varepsilon \tag{1}$$

However, this method can potentially identify a model error as a user request. Such model errors necessarily occur in practice since the dynamic model is by nature never able to accurately reflect the real world, without limitation also because the exact mass distribution of a manipulator is difficult to determine and for instance also because installing a tool on the manipulator significantly influences the model, depending on the weight of the tool. In practice, the variance between the dynamic model and reality have been shown to easily be 5-10%.

Figure 1:
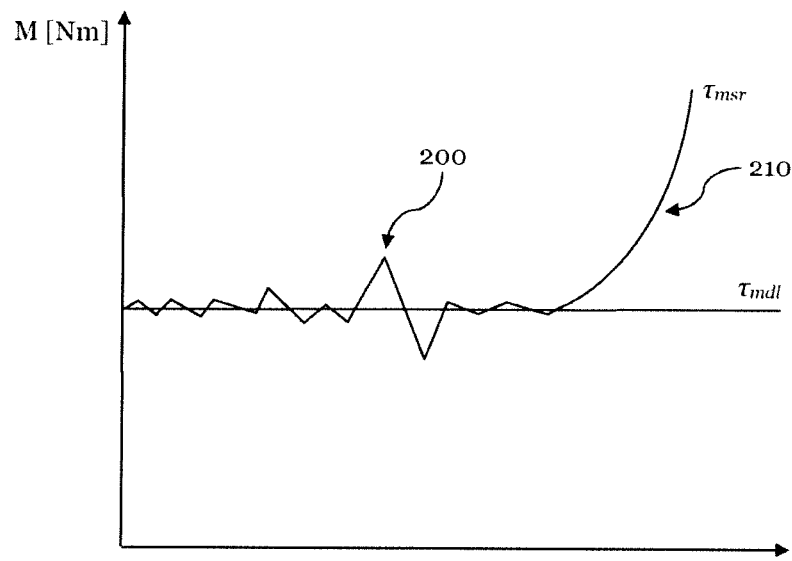
FIG. 1 is a schematic depiction of a torque curve of an axis of an articulated arm robot.

This will be discussed in detail based on FIG. 1. FIG. 1 is schematic and an exemplary representation of the torque curve over time as measured on an axis (e.g. axis 3) of a manipulator, in particular an articulated arm robot. The torque is preferably recorded with strain gauges arranged on the drive shaft of the axis. Stated in a simplified manner, when at rest, a constant torque acts on the drive shaft of the axis, the constant torque generated by gravity acting on the members of the manipulator and/or the articulated arm robot that can be moved by the axis. For a given state (pose) of the manipulator, $T_{mdl}$ represents the modeled torque (e.g. 30 Nm in this case) in the form a straight line. In order to prevent the manipulator from sagging downward due to gravity, the controller must apply an (opposing) torque of 30 Nm on the actuator of the affected axis. However, the measured torque $T_{msr}$ is never fully constant, but instead fluctuates in practice, e.g. due to vibrations, the installation orientation of the manipulator, the applied load, or other environmental influences, but in particular due an unavoidable inherent noise of the installed sensors and/or control equipment, etc. This is represented by the "jittery" curve of $T_{msr}$ in FIG. 1. However, by specifying an error limit $\varepsilon$, these minor fluctuations about the modeled (idealized) torque $T_{mdl}$ are rendered unproblematic. However, without the error limit, the manipulator and/or articulated arm robot and/or its controller would already interpret these minor fluctuations of $T_{mdl}$, for example due to vibrations of the manipulator, as a user request and move the manipulator in the direction specified by the external force. A larger fluctuation occurs at Point 200 in the depicted example. This fluctuation can for instance be generated by a forklift passing by in close proximity to the manipulator base or by an operator bumping into the manipulator. Such a shock can generate a torque spike that lies outside the error limit, causing the manipulator to erroneously detect the torque spike at Point 200 as a user request.

In order to prevent this, the measurement value time series of $T_{msr}$ is inventively tracked, in particular continuously. The measurement value time series is in this case preferably tracked on a manipulator that is locked in position (a "locked state"). Barring a comparatively minor residual noise, $T_{msr}$ then retains the same value when the manipulator is at rest. However, the value of $T_{msr}$ changes greatly when the operator exerts a force on the manipulator to manually move the manipulator. This is illustrated as an example at Point 210 in FIG. 1. In the locked state, a variable reference value Tref is therefore formed based on the time series of the measurement value Tref; the reference value assumes the role of the modeled torque midi. Tref is preferably continuously tracked by an average value filter, for instance by always incorporating the last 10 or 15 measurements into the average value calculation:

$$\tau_{ref} = \frac{\sum_i \tau_{msr,i,eingefroren}}{nsamples}$$

The user request detection is now formed analogously to (1):

$$\tau_{ext,ref} = \tau_{msr} - \tau_{ref}$$

$$|\tau_{ext,ref}| > \varepsilon \quad (2)$$

The reference value is therefore not fixed but is instead adjusted to a certain degree to the actually measured torque time series. By suitably adjusting the average value calculation, steps can be taken to prevent that e.g. the spike at Point 200 is interpreted as a user request. The significantly larger force exerted at Point 210—which is applied intentionally by the user—is however accurately detected as a user request, and the controller of the manipulator then moves the manipulator in the direction specified by the operator. As can be seen, the user request is therefore detected independently of the (uncertain) dynamic model, but is instead detected based on the variance of an actually measured value from an averaged measurement value time series. The inventive time-series-based detection of the release request provides without limitation the following advantages: 1) a smaller error limit can be selected since the model error is no longer erroneously identified as a user request (touch), e.g. the manipulator becomes "more sensitive"; 2) the manipulator can only be released by human touch—even when jammed; e.g. the operator can "intuitively" unjam the manipulator in a controlled manner.

Alternatively, a single "snapshot" reading can also be generated; this reading is recorded when the manipulator is at rest (e.g. the velocity and acceleration of the manipulator are ZERO) and is used as the reference value $T_{ref}$.

Analogous to the torque-based approach described above, the user request can also be detected on the basis of position values. The modeled torque values and the measured torque values are then replaced by modeled positions and measured positions, analogous to the application. For instance, the reference would be determined on the basis of a series of previously measured positions, which are averaged for this purpose. A simple differential of a measured actual position $q_{msr}$ and a modeled target position $q_{mdl}$:

$$q_{delta\_ext} = q_{msr} - q_{mdl},$$

is then replaced by a reference position $q_{ref}$ which is in turn determined analogously to the reference torque as an average of previously measured positions:

$$q_{ref} = \frac{\sum_i q_{msr,i,eingefroren}}{nsamples}$$

Unlike the modeled position, the reference position is therefore not fixed but is instead variable. The user request detection can in this case be calculated analogously to (2) as:

$$q_{delta\_ext,ref} = q_{msr} - q_{ref}$$

$$|q_{delta\_ext,ref}| > \varepsilon$$

The "Freeze" user request is preferably detected by placing the system at rest, e.g. when the user holds the manipulator in position for a brief timespan (e.g. 0.5 seconds):

$$|\dot{q}| < \varepsilon \text{ for a timespan}$$

Jog Mode

In particular for a system as described above that detects the states "Locked" and "Released", it can be desirable to move the system in small, incremental steps. The basic principle in this case is as follows:

1. In the locked state, the system is controlled "rigidly" (position-controlled or rigid impedance control). The algorithm in this case specifies the target position $q_{mdl, freeze}$.

2. If small deviations are detected $$|T_{ext,ref}| > \delta \text{ or } |q_{delta\_ext,ref}| > \delta, \text{ whereby if } \varepsilon > \delta \text{ is true,}$$

the target position $q_{mdl, freeze}$ is adjusted accordingly.

Joint-Specific Adjustment of the Target Position $q_{mdl, freeze}$

Shifting the position is accomplished by moving by a defined distance, for example:

$$q_{mdl,freeze}^* = q_{mdl,freeze} + a * q_{delta\_ext} \text{(position-based)}$$

$$q_{mdl,freeze}^* = q_{mdl,freeze} + b * T_{ext} \text{(torque-based)}$$

The amplification parameters a and b are preferably employed for adjusting the sensitivity of the manipulator to the user.

Cartesian Adjustment of the Target Position

The user request can also be interpreted as a cartesian input, provided the user touched the manipulator on the end effector:

$$\Delta x = a * J * q_{delta\_ext} \text{(position-based calculation of a cartesian shift)}$$

$$\Delta x = b * (J^T)^{-1} * T_{ext} \text{(torque-based calculation of a cartesian shift)}$$

The cartesian increment $\Delta x$ can only be converted back into joint coordinates with an arbitrary inverse-kinematic approach (for instance an analytical inverse kinematic procedure):

$$q_{mdl,freeze}^* = q_{mdl,freeze} + J^{-1}\Delta \text{(torque-based)}$$

Automatic Selection of the Joint-Specific or Cartesian Mode

The dynamics of a manipulator arm and/or a manipulator are typically determined by means of a Jacobi matrix. The Jacobi matrix of a manipulator arm generally describes the mapping of joint velocities into linear velocities of the TCP ("Tool Center Point"; the reference point located at a suitable location of the tool) and the change of the end effector orientation over time in relation to a reference coordinate system. It is important to note that the Jacobi matrix is non-square in the case of many conventional manipulators and is therefore preferably calculated using a pseudo-inverse. The pseudo-inverse can in turn be used to obtain a consistency condition for automatically differentiating between the cartesian and joint-specific mode.

Any pseudo-inverse splits the solution into two spaces: the "Range Space" and the "Null Space" (N()). In order to determine whether a touch—and therefore the user request—occurred on the end effector, the calculated deviation $T_{ext}$ or $q_{delta\_ext}$ must be located in the relevant null space of the Jacobi matrix. The following criterion can then be defined:

If one of the relevant relationships $$|N(J)*q_{delta\_ext}|<\alpha(position)$$

or $$|N(J^T)*T_{ext}|<\alpha(torque)$$

is true, the cartesian method is used. The joint-specific method is used otherwise since the calculated and/or measured deviation $T_{ext}$ or $q_{delta\_ext}$ is inconsistent with the cartesian world. N(J), respectively N($J^T$), depict the relevant null space of the (inverse) matrix.

Alternative Implementation without Determining the Null Space

If the direction was estimated based on the pseudo-inverse, $$F=(J^T)^{-1}*T_{ext},$$

a comparable validation can be facilitated by a simple forward calculation:

$$T^*=J^T*F$$

The newly calculated vector T* should not materially differ from $T_{ext}$.

The following criterion can then be formulated:

$$|T^*-T_{ext}|<\alpha$$

Control Operating Modes

As discussed initially, the aforementioned gravity-compensation-based algorithms can be implemented in the form of an impedance control as well as a position control. The impedance control inventively results in an improved sensitivity since the joint rigidity is set to "ZERO" in "Released" mode, thus giving the user very soft and highly sensitive control over the manipulator.

The method described herein nevertheless also works for position-controlled manipulators when the target position $q_{mdl}$ is set to the instantly measured position $q_{msr}$ in released mode:

$$q_{mdl}=q_{msr}$$

In this case, the internal position control loop of the manipulator is essentially "cut open"; since the touch inputs a position differential, the manipulator is required to move. The performance of the overall system then depends on the "intrinsic" capabilities (e.g. friction) of the manipulator and the position control laws. By appropriately "amplifying" the observed error $q_{delta\_ext}$, it is possible to further improve handling (the "feeling"). However, this can mildly destabilize the overall system, which requires additional control-technology measures. The "internal" position control of the manipulator is therefore preferably made "soft". This is also of particular interest for manipulators that do not provide a torque control.

Figure 2:
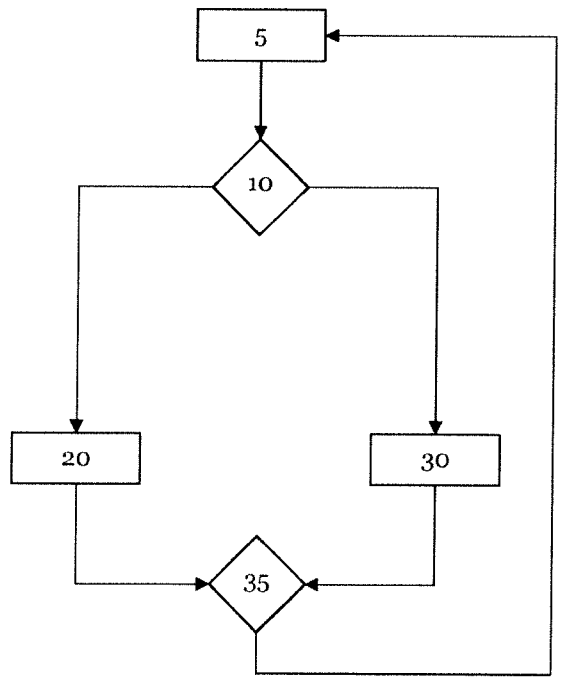
FIG. 2 is a schematic depiction of an exemplary sequence of a method for controlling a manipulator.

FIG. 2 shows an illustration and example of an inventive process sequence for controlling a manipulator, preferably an industrial robot. It goes without saying that the method described herein is not limited to industrial robots or articulated arm robots, but is equally suited for any type of manipulator. The manipulator is locked in Step 5. A user "release" request—as described above—is detected in Step 10, resulting in a local motion release of the manipulator in response to the detected user request. However, in the depicted example, the release can be issued by two methods:

If the model is recognized as valid in step 10, the manipulator is released in response to the user request (Step 20). The manipulator's controller then moves the manipulator according to the direction specified by the operator and/or user by sending control signals to the various actuators of the manipulator.

However, if the model is recognized as invalid in Step 10, the manipulator is released "rigidly" in Step 30, e.g. the manipulator moves very slowly. This mode is particularly advantageous for a crash recovery, for instance when the manipulator is brought into a jammed state by other software. Such a jam can be relatively easily corrected by a gravity compensation. If a user "Freeze" request is detected in Step 35, the manipulator returns to the locked state (Step 5).

Figure 3:
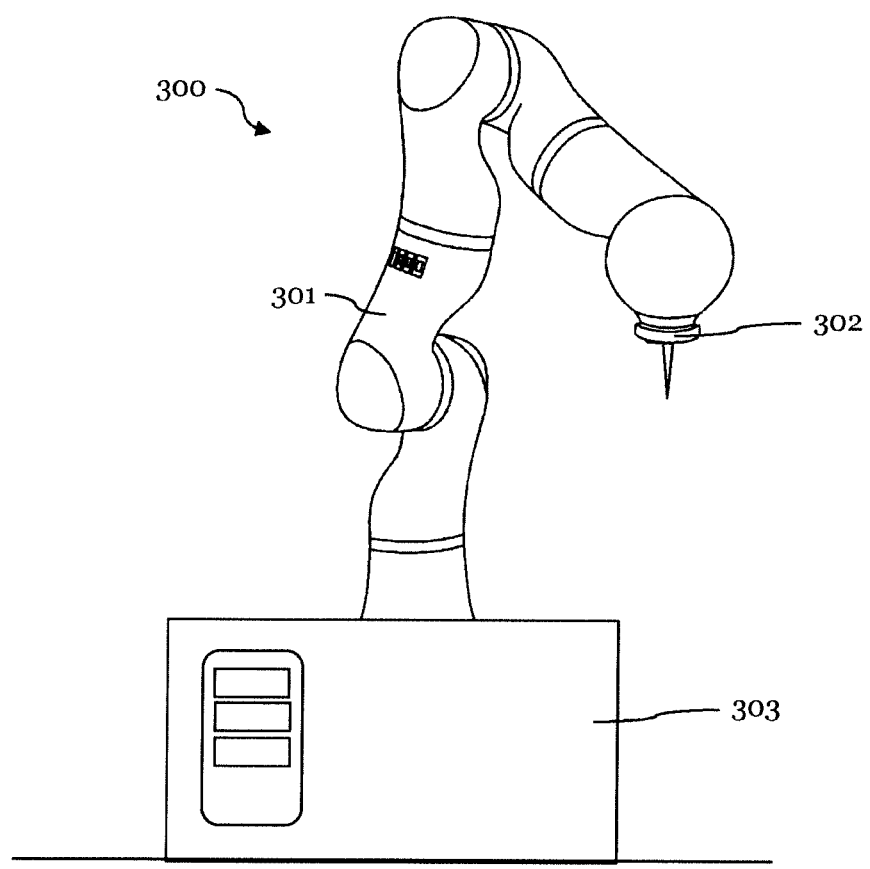
FIG. 3 is a schematic depiction of a robot system arranged to execute an inventive method.

FIG. 3 shows a schematic illustration of a robot system 300 that comprises a manipulator 301, in particular an articulated arm robot 301 that can be grabbed and manually guided by its flange and/or end effector 302. The system 300 also features a control device 303. The latter is in this case arranged to execute the aforementioned methods for controlling the manipulator 301.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for controlling a manipulator, comprising:
   detecting a release request based on a force exerted by an operator on the manipulator; and
   releasing the manipulator in response to detecting the release request;
   wherein detecting the release request comprises tracking at least one measurement value that characterizes the state of the manipulator; and
   wherein releasing the manipulator comprises releasing the manipulator with increased rigidity in response to a determination that a dynamic model of the manipulator is invalid.

2. The method of claim 1, wherein the manipulator is an articulated arm robot.

3. The method of claim 1, wherein the at least one measurement value that characterizes the state of the manipulator comprises at least one of a torque of the manipulator or a position of the manipulator.

4. The method of claim 3, wherein detecting the release request comprises detecting when a difference between a measured torque and reference torque exceeds the magnitude of a specified error limit;
wherein the reference torque is calculated as an average of previously measured torque values, or by a snapshot reading.

5. The method of claim 3, wherein detecting the release request comprises detecting when a difference between a measured position and a reference position exceeds the magnitude of a specified error limit;
wherein the reference position is calculated as an average of previously measured positions, or wherein the reference position is formed by a snapshot reading.

6. The method of claim 1, further comprising:
detecting a lock request when the operator holds the manipulator in a position for a specified timespan; and
locking the position of the manipulator in response to detecting the lock request.

7. A method for controlling a manipulator, comprising:
detecting a release request based on a force exerted by an operator on the manipulator; and
in response to detecting the release request, moving the manipulator a predetermined amount and subsequently locking the position of the manipulator.

8. The method of claim 7, wherein the manipulator is an articulated arm robot.

9. The method of claim 7, wherein moving the manipulator comprises a joint-specific or Cartesian adjustment of a target position of the manipulator.

10. The method of claim 9, further comprising automated selection of the Cartesian adjustment of the target position of the manipulator in response to detecting that the operator has touched the manipulator at an end effector.

11. The method of claim 10, wherein detecting that the operator has touched the manipulator at an end effector comprises evaluating a Jacobi matrix.

12. The method of claim 11, wherein evaluating a Jacobi matrix comprises defining a null space.

13. The method of claim 7, wherein a motion sensitivity of the manipulator is adjustable by means of an amplification parameter.

14. A robot system, comprising:
a manipulator; and
a control device configured to execute a method for controlling a manipulator in accordance with claim 1.

15. The robot system of claim 14, wherein the manipulator is an articulated arm robot.

* * * * *